(12) United States Patent
Lei et al.

(10) Patent No.: US 12,135,925 B1
(45) Date of Patent: Nov. 5, 2024

(54) LIBRARIES-BASED EXPLICIT FRACTURE AND FRAGMENTATION FRAMEWORK

(71) Applicant: Triad National Security, LLC, Los Alamos, NM (US)

(72) Inventors: Zhou Lei, Los Alamos, NM (US); Esteban Rougier, Los Alamos, NM (US); Earl E. Knight, Rio Rancho, NM (US); Antonio Munjiza, London (GB)

(73) Assignee: Triad National Security, LLC, Los Alamos, NM (US)

( * ) Notice: Subject to any disclaimer, the term of this patent is extended or adjusted under 35 U.S.C. 154(b) by 882 days.

(21) Appl. No.: 16/847,949

(22) Filed: Apr. 14, 2020

Related U.S. Application Data

(60) Provisional application No. 62/906,674, filed on Sep. 26, 2019.

(51) Int. Cl.
  *G06F 30/23* (2020.01)
  *G06F 30/17* (2020.01)
  *G06F 111/10* (2020.01)

(52) U.S. Cl.
  CPC ............. *G06F 30/23* (2020.01); *G06F 30/17* (2020.01); *G06F 2111/10* (2020.01)

(58) Field of Classification Search
  CPC ....... G06F 30/23; G06F 30/17; G06F 2111/10
  USPC .......................................................... 703/2
  See application file for complete search history.

(56) References Cited

U.S. PATENT DOCUMENTS

| | | | | |
|---|---|---|---|---|
| 8,190,414 B2 * | 5/2012 | Huang | ............... | E21B 49/00 703/10 |
| 10,275,551 B2 | 4/2019 | Rougier et al. | | |
| 2018/0245435 A1 * | 8/2018 | Becker | ............... | G01V 99/005 |

OTHER PUBLICATIONS

Xu et al. (Numerical simulations of Fast Crack Growth in Brittle Solikds, (37 pages)). (Year: 1994).*
Xu et al. (Finite Element Analysis of Stress Singularit es in Attached Flip Chip Packages, (6 pages). (Year: 2000).*
Camacho et al., "Computational Modelling of Impact Damage in Brittle Materials," *Int. J. Solids Structures*, 33(20-22):2899-2938 (Aug. 1996).
Dugdale, "Yielding of Steel Sheets Containing Slits," *J. Mech. Phys. Solids*, 8(2):100-104 (May 1960).
Geubelle et al., "A Spectral Method for three-Dimensional Elastodynamic Fracture Problems," *J. Mech. Phys. Solids*, 43(11):1791-1824 (Nov. 1995).

(Continued)

*Primary Examiner* — Andre Pierre Louis
(74) *Attorney, Agent, or Firm* — Klarquist Sparkman, LLP (57) ABSTRACT

Computer-implemented methods can include providing a numerical simulation mesh comprising a plurality of nodes and performing a numerical simulation of a solid material using the mesh and a user-selectable transition threshold associated with a cohesive zone model traction-separation relation. Additional computer-implemented methods can include performing a numerical simulation of a solid material using a numerical simulation mesh comprising a plurality of nodes, wherein the numerical simulation includes a transition threshold associated with a cohesive zone model traction-separation relation, and comparing local material states including a strain state of the mesh to the transition threshold during the performing the numerical simulation to determine whether to dynamically insert cohesive elements in the finite element mesh.

19 Claims, 10 Drawing Sheets

(56) References Cited

OTHER PUBLICATIONS

Hillerborg et al., "Analysis of Crack Formation and Crack Growth in Concrete by Means of Fracture Mechanics and Finite Elements," *Cement and Concrete Research*, 6(6):773-782 (Nov. 1976).
Munjiza et al., "Combined Single and Smeared Crack Model in Combined Finite-Discrete Element Analysis," *Int. J. Numer. Meth. Engng.*, 44:41-57 (Jan. 1999).
Papoulia et al., "Time continuity in cohesive finite element modeling," *Int. J. Numer. Meth. Engng.*, 58:679-701 (Jul. 2003).
Xu et al., "Numerical Simulations of Fast Crack Growth in Brittle Solids," *J. Mech. Phys. Solids*, 42(9):1397-1434 (Sep. 1994).

\* cited by examiner

FIG. 1A

● Velocity Nodes

FIG. 1B

○ Material Nodes

LIBRARIES-BASED EXPLICIT FRACTURE AND FRAGMENTATION FRAMEWORK

CROSS REFERENCE TO RELATED APPLICATION

This application claims priority to U.S. Provisional Patent Application No. 62/906,674, filed Sep. 26, 2019, and is incorporated herein by reference.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The field is numerical modeling of solid fractures.

BACKGROUND

Existing fracture models have long suffered from various issues, e.g. excessive computational cost and/or time discontinuities. Therefore, a need remains for improved approaches without attendant drawbacks.

SUMMARY

According to examples of the disclosed technology, computer-implemented methods include providing a numerical simulation mesh comprising a plurality of nodes and performing a numerical simulation of a solid material using the mesh and a user-selectable transition threshold associated with a cohesive zone model traction-separation relation. Some examples further include comparing local material states of the mesh to the user-selectable transition threshold during the performing the numerical simulation to determine whether to insert cohesive elements in the mesh. Examples can further include dynamically inserting cohesive elements in the mesh based on the comparison, and balancing loads at the inserted cohesive elements. In some examples, the comparing comprises applying a discrete fracture criterion at a node of the plurality of nodes of the mesh based on the local material states of the mesh and the transition threshold. In selected examples the discrete fracture criterion defines when the cohesive elements are to be dynamically inserted and is a generalized criterion that can vary for different materials and that is a function of the Cauchy stress tensor and/or the strain tensor and the transition threshold. Some examples further include, for a met discrete fracture criterion, dynamically inserting cohesive elements in the mesh and applying a vector material dependent field function to determine a direction of a fracture from a fracture initiating node. Examples can further include splitting the fracture initiating node into at least two nodes and mapping the material states to an adjacent velocity node closest to the direction of the fracture. Additional examples can include remeshing at least a portion of the mesh proximate the fracture initiating node to define a mesh shape oriented along the direction of the fracture and splitting the fracture initiating node into at least two nodes and mapping the material states to adjacent velocity nodes. In representative examples, the user-selectable transition threshold is defined in a range between 0 and 1 and corresponds to a ratio of a stress and a fracture strength of the solid material. In some examples, the plurality of nodes comprises velocity nodes associated with material-specific fracture libraries and defining simplex shapes, and material nodes associated with the simplex shapes and associated with material libraries. In specific examples, the performing the numerical simulation includes determining velocities and positions for the velocity nodes using one or more numerical analysis techniques, determining material states for the material nodes based on the material libraries and the determined velocities and positions, and determining material states for the velocity nodes based on the determined material states for the material nodes. Material-specific fracture libraries and material libraries can be user-selectable libraries. In some examples, the material-specific fracture libraries include fracture material libraries associated with discrete fracture propagation, and the material libraries can include continuum material libraries. Continuum material libraries can include libraries describing elasticity, plasticity, damage, strain rate, hardening, shock, or phase change. In specific applications, examples can include processing a solid material based on the performed numerical simulation, including one or more of surface material processing, subsurface material processing, oil drilling, fracking, well drilling, subsurface explosions, or mining operations, earthquake rupture simulations, or structural collapse. In some examples, the insertion of cohesive elements corresponds to a time-continuous transition between continua mechanics modeling and discontinua mechanics modeling. Local material states can include a stress, a strain, a stress and strain, a stress and an additional other material state, a strain and an additional other material state, or a stress, strain and an additional other material state. Selected examples can further include removing cohesive elements from the mesh during the performing the numerical simulation based on a comparison of local material states of the mesh to a selected cohesive element removal threshold. Meshes can include finite-discrete element method meshes.

According to another aspect of the disclosed technology, apparatus include at least one processor and memory coupled to the at least one processor and configured with instructions that, when executed by the at least one processor, cause the apparatus to perform a numerical simulation of a solid material using a numerical simulation mesh comprising a plurality of nodes, wherein the numerical simulation includes a user-selectable transition threshold associated with a cohesive zone model traction-separation relation that determines whether to insert cohesive elements in the mesh.

According to a further aspect of the disclosed technology, computer readable media have stored thereon computer executable program code which, when executed on a computer system, causes the system to perform a numerical simulation of a solid material using a numerical simulation mesh comprising a plurality of nodes, wherein the numerical simulation includes a user-selectable transition threshold associated with a cohesive zone model traction-separation relation that determines whether to insert cohesive elements in the mesh.

According to another aspect of the disclosed technology, computer-implemented methods include performing a numerical simulation of a solid material using a numerical simulation mesh comprising a plurality of nodes, wherein the numerical simulation includes a transition threshold associated with a cohesive zone model traction-separation relation, and comparing local material states including a strain state of the mesh to the transition threshold during the performing the numerical simulation to determine whether to dynamically insert cohesive elements in the finite element mesh. Some examples further include associating a continuum material library with a node of the mesh, wherein the associated continuum material library uses a strain state to define a fracture initiation. In selected examples, the transition threshold is user-selectable.

The foregoing and other objects, features, and advantages of the disclosed technology will become more apparent from the following detailed description, which proceeds with reference to the accompanying figures.

DETAILED DESCRIPTION

Representative examples of the disclosed technology use a unified cohesive zone model (UCZM) to resolve various issues with previous cohesive zone models in finite-discrete element models (FDEM). UCZMs can incorporate both an intrinsic cohesive zone model (CZM) and an extrinsic CZM into a unified model, taking advantage of features of intrinsic and extrinsic models and avoiding disadvantages specific to intrinsic-specific and extrinsic-specific models. Unified model examples unify intrinsic and extrinsic type approaches through the introduction of a programmable threshold parameter into the model fracture criteria. This allows an FDEM simulation using a UCZM to optimize computational cost. In various examples, a balancing and recalculating of the forces around the newly introduced cohesive elements, both before and after the cohesive elements are inserted, can ensure the conservation of momentum and prevent the occurrence of time discontinuities, so as to provide for a smooth transition from a continuum model to a discontinuum model during a simulation. In selected examples, a strain tensor is a material state used to determine whether to dynamically insert cohesive elements into an FDEM element mesh, and also in evaluating fracture criteria. Like stress states, strain state examination can allow for the introduction of discrete fractures at any stage of a simulation. Also, the use of a strain tensor and/or other material states in the dynamic cohesive element insertion and/or discrete facture criteria evaluation, as opposed to a stress tensor alone, further enables the use of a vast array of complex material libraries, including user-defined material libraries that could not be used with previous discrete fracture cohesive zone models. The various apparatus and methods disclosed herein can provide improved modeling that can be useful for a variety of applications, including mineral processing, oil and gas exploration, earthquake and building modeling, and basic sciences including planetary science.

Figure 1A:
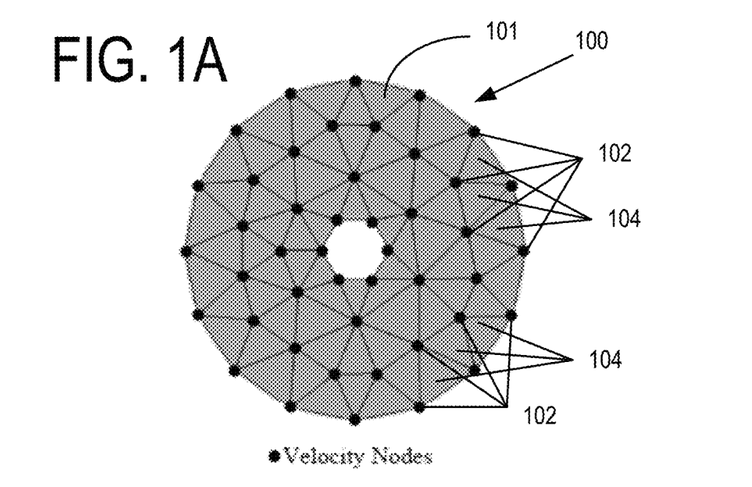
FIGS. 1A-1D are illustrations of a finite-discrete element method (FDEM) mesh.

FIG. 1A shows an example of a mesh 100 of FDEM elements formed by discretizing a solid object 101 into smaller shapes. The mesh 100 includes a plurality of velocity nodes 102 at vertices that define simplex shapes 104 between the nodes. As shown the simplex shapes are triangles, but other shapes can be used. For simplicity of illustration, the mesh 100 is shown as a two-dimensional arrangement. Additional examples include three-dimensional meshes and associated three-dimensional shapes. In some examples, the mesh 100 can be constructed by a user with an FDEM workbench, such as with a computer system having a graphical user interface. The velocity nodes 102 typically have associated position and velocities that contain initial values that become updated during a simulation as various forces act upon the mesh 100.

Figure 1B:
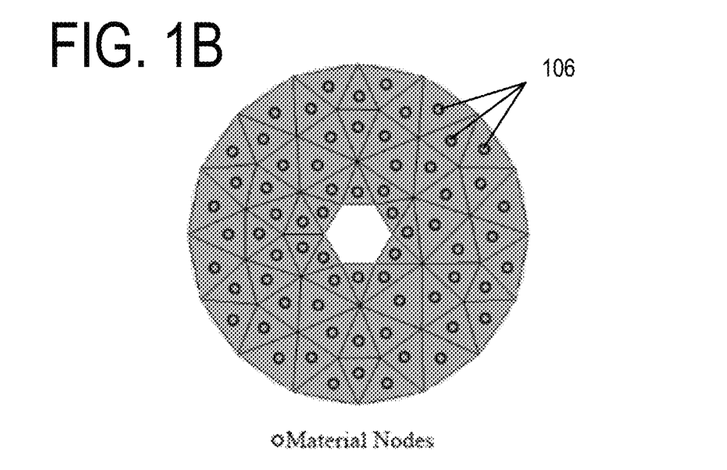

FIG. 1B shows the same mesh 100 but with a plurality of material nodes 106 associated with each of the simplex shapes 104 defined by the velocity nodes 102. To model the effects of various inputs on the solid object 101, various FDEM numerical analysis methods can be used as understood by those with skill in the art, such as large-strain-large displacement combined finite-discrete element methods, by way of example. Using FDEM and/or other numerical techniques, updated velocity and positions can be obtained at the velocity nodes 102. Examples of other numerical techniques that can be used with the various methods and apparatus disclosed herein (substituted or in combination) include finite element methods (FEM), discrete element methods (DEM), extended discrete element methods (XDEM), applied element methods (AEM), mixed finite element methods (MFEM), finite difference methods (FDM), etc.

Figure 1C:
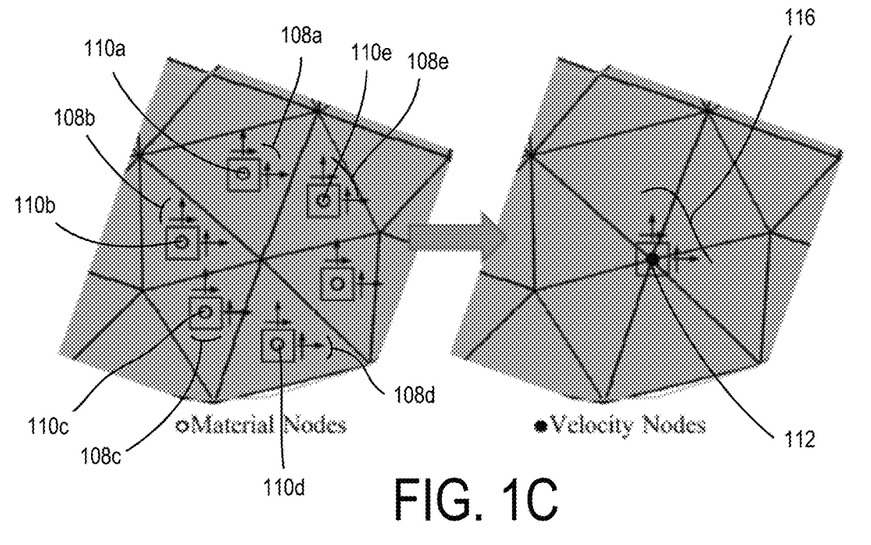

As shown in FIG. 1C, various material state sets 108a-108e, such as stress, strain, temperature, etc., can be calculated at material nodes 110a-110e of the material nodes 106, using the calculated velocities and positions at the neighboring velocity nodes 102 and continuum material libraries (e.g., relating to elastic and/or plastic deformation) associated with the material nodes 110a-110e. From material states at the material nodes 106, material states 114 can be computed at neighboring velocity nodes 102, using interpolation, extrapolation, averaging, or other estimation or approximation methods. For example, the material state sets 108a-108e can be extrapolated to velocity node 112 of the velocity nodes 102 to determine a velocity node material state set 116 of the material states 114.

Figure 1D:
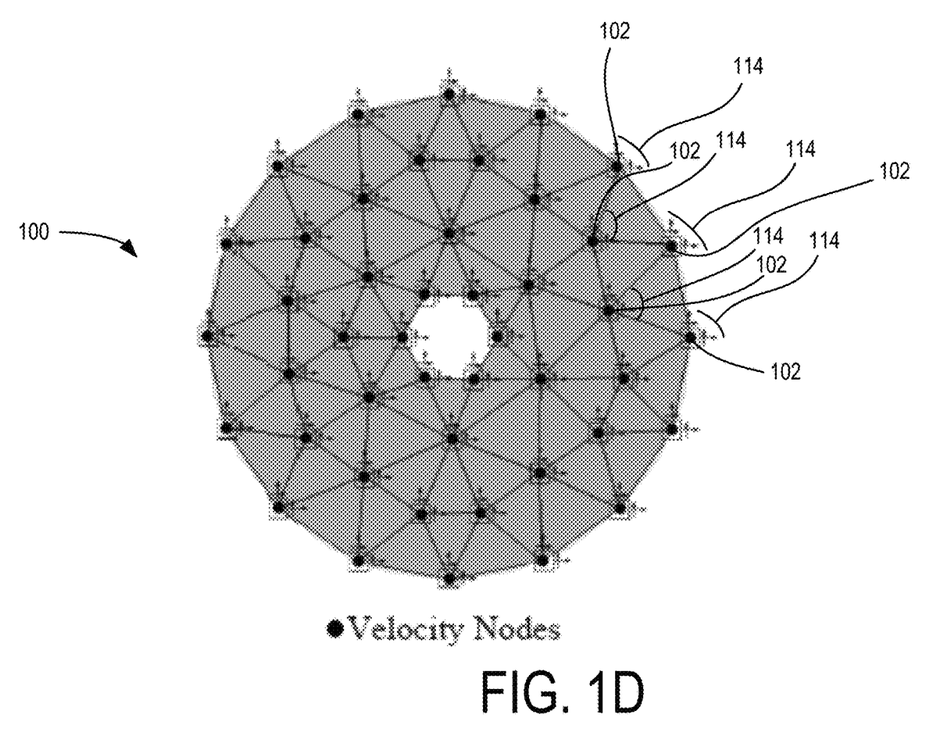

As shown in FIG. 1D, the material states 114 can be determined at each of the velocity nodes 102 of the mesh 100. Fracture material libraries can be associated with or attached to the velocity nodes 102 to describe complex fracture initiation. In this way, complex continuum material libraries, such as those relating to elasticity, plasticity, damage, strain rate, hardening, shock, phase change, etc., can be allowed to work with complex fracture libraries. In representative examples, software modules can be configured so that various libraries can be associated or attached by a user to the various nodes 102, 106 of mesh 100 in a componentbased fashion, allowing easy addition or removal of libraries to or from the FDEM workbench and mesh 100.

In representative examples, FDEM simulations are performed in which discrete fractures can be introduced. In some examples, to introduce discrete fractures in a mesh such as mesh 100, material states including stress and strain states are calculated at the velocity nodes, such as by using the stress and strain fields at the material nodes associated with each velocity node. At one or more velocity nodes (typically each one of the mesh 100), a discrete fracture insertion criterion is applied to determine if a crack would be created. The discrete fracture insertion criterion defines when cohesive elements are dynamically inserted, and is typically a generalized criterion which can be different for different materials and can be of the following form:

$$\phi(\alpha, C, \varepsilon, \dots) = 0 \tag{1}$$

where $\phi$ is a scalar field, $\alpha$ is a parameter controlling a point of transition from continuum to discontinuum, $C$ is the Cauchy stress tensor, and $\varepsilon$ is the strain tensor. If the value of the scalar field $\phi$ at a given velocity node is greater than zero, a fracture has been initiated. In different examples, the scalar field $\phi$ can be a function of fewer or different material states. In some examples, the parameter $\alpha$ can be absent or fixed at 0 or 1 such as with fixed intrinsic or extrinsic CZMs. To determine a direction in which the crack would extend, a vector material-dependent field function can be applied, such as of the following form:

$$r(C, \varepsilon, \dots) = r_i i + r_j j + r_k k \tag{2}$$

Figures 2, 3, 4:
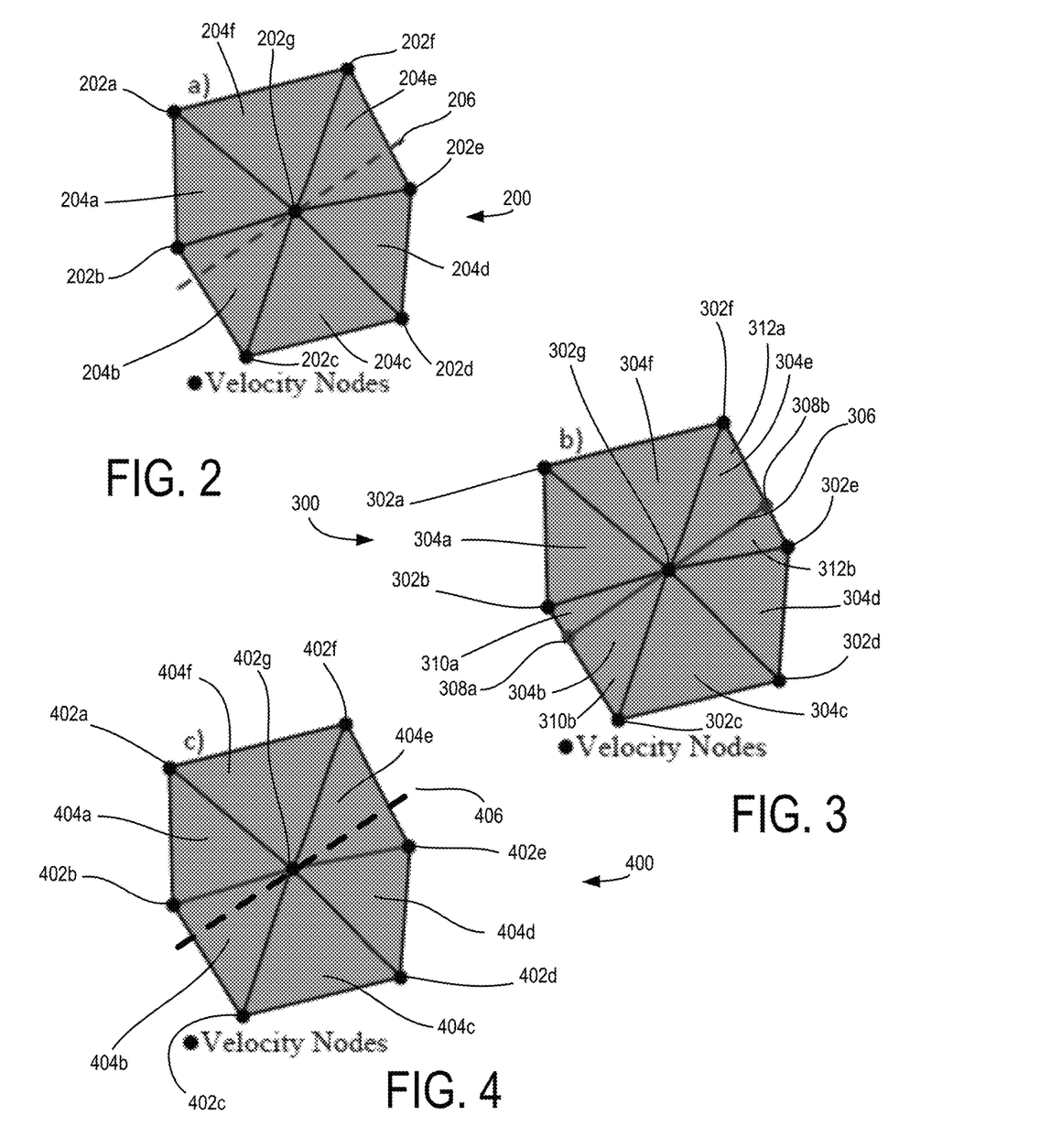
FIGS. 2-4 are illustrations of crack directions in portions of an FDEM mesh.

Various approaches can be used to create the crack in a FDEM mesh, such as the mesh 100. FIG. 2 show an example of a mesh 200 that includes velocity nodes 202a-202g which define simplex shapes 204a-204f. A dashed line 206 shows a determined crack direction, such as by applying the vector material-dependent field function (2). The dashed line 206 intersects an edge of the shape 204e at a position closer to the velocity node 202e than the velocity node 202f. The dashed line 206 also intersects an edge of the shape 204b at a position closer to the velocity node 202b than the velocity node 202c.

FIG. 3 illustrates a remeshing of a mesh 300 initially including velocity nodes 302a-302g defining simplex shapes 304a-304f. A determined crack direction extends along solid line 306. New velocity nodes 308a, 308b are introduced along edges of the shapes 304b, 304e. Also, the shape 304b is split into new shapes 310a, 310b based on the position of the new velocity node 308a, and the shape 304e is split into new shapes 312a, 312b based on the position of the new velocity node 308b. Thus, in remeshing approaches, one or more new shapes can be formed with edges that extend along a calculated crack direction.

FIG. 4 shows a mesh 400 including velocity nodes 402a-404g defining simplex shapes 404a-404f. A crack direction can be determined to extend along a dashed line 406, similar to dashed line 206 in FIG. 2. Instead of remeshing with additional simplex shapes, a crack can be mapped to velocity nodes 402b, 402e based on the closer proximity of the dashed line 406 at the intersection with edges of the shapes 404b, 404e to the velocity nodes 402b, 402e than the more distant velocity nodes 402c, 402f. In additional examples, cracks can be mapped using other approaches, including by way of example, a combination of remeshing and mapping, etc.

Figure 5A:
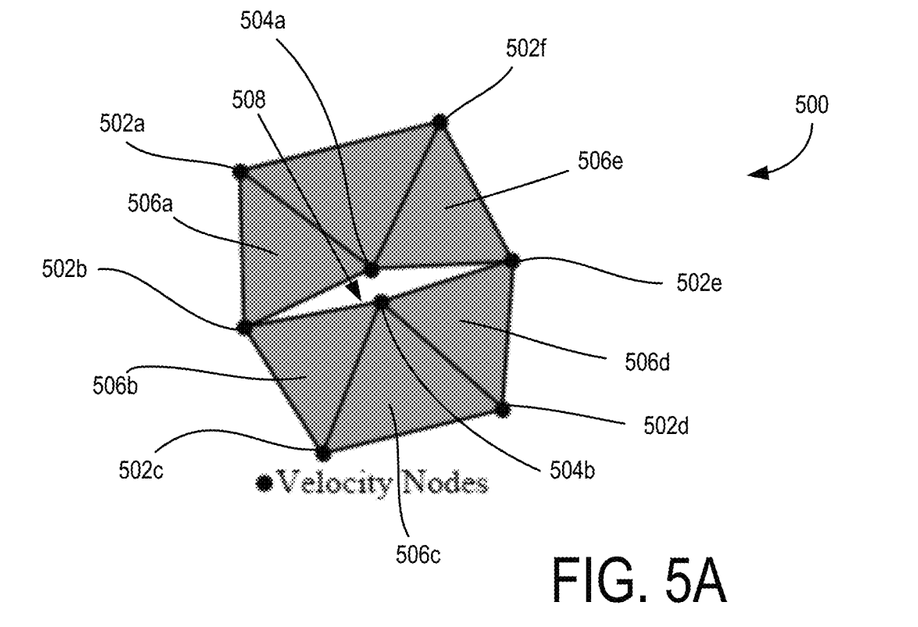
FIGS. 5A-5B are illustrations of crack formation and load balancing in a FDEM mesh.
Figure 5B:
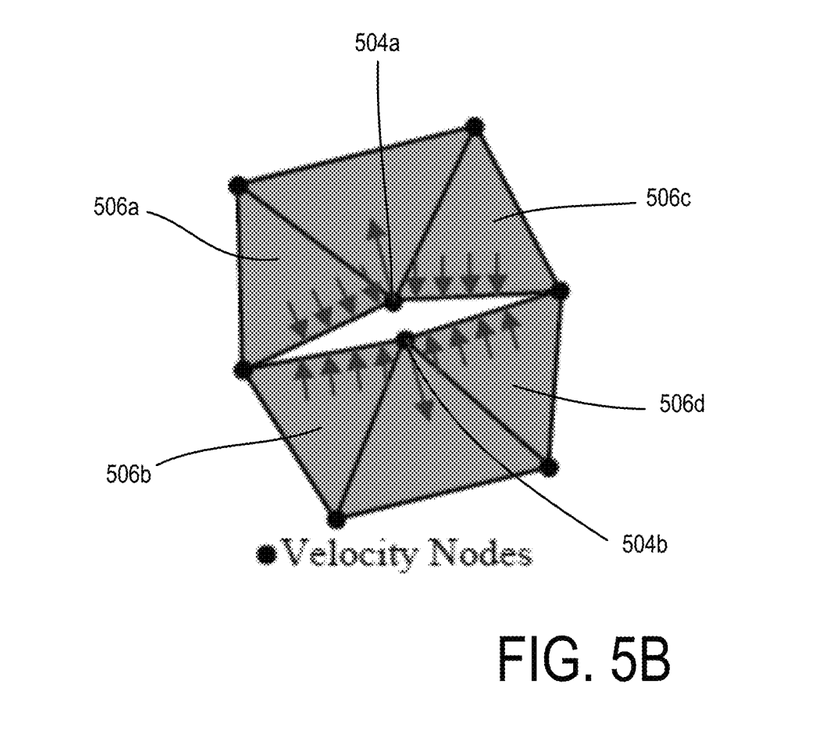

After a crack path is determined from a crack direction, a crack in a FDEM mesh can be formed by splitting a velocity node into two or more velocity nodes. With reference to FIG. 5A, a mesh 500 includes velocity nodes 502a-502f similar to velocity nodes 202a-202f. The mesh 500 also includes additional nodes 504a-504b which can be formed by splitting a velocity node (not shown, similar to velocity node 202g) and replacing the velocity node with the additional nodes 504a-504b. Simplex shapes 506a-506f are defined by the velocity nodes 502a-502f, 504a-504b, and a crack 508 is formed along the crack path. For simplicity of illustration, the distance between the velocity nodes 504a-504b is shown to be large, but in typical simulations, the velocity nodes 504a-504b are effectively on top of each other at formation. Thus, cohesive elements have been inserted into the mesh 500 describing an interfacial cohesion between various surfaces (for 3D) or lines (for 2D) of adjacent elements of the mesh 500, such as between two or more of the simplex shapes 506a-506f. FIG. 5B illustrates a force balance (shown with arrows) for the inserted cohesive elements that can be used in representative examples, such as the cohesive elements associated with the crack 508. The force balance can include a balancing between the velocity node 504a and the edges of the simplex shapes 506a, 506b, and between the velocity node 504b and the edges of the simplex shapes 506d, 506e. By performing the load balancing during a simulation when cohesive elements are inserted, such as before and after the velocity node is split into the velocity nodes 504a, 504b and the crack 508 is created, a time-discontinuousness during the simulation associated with the initially rigid characteristics of an extrinsic CZM (or other CZM in which cohesive elements are dynamically inserted) can be reduced or eliminated.

Figure 6:
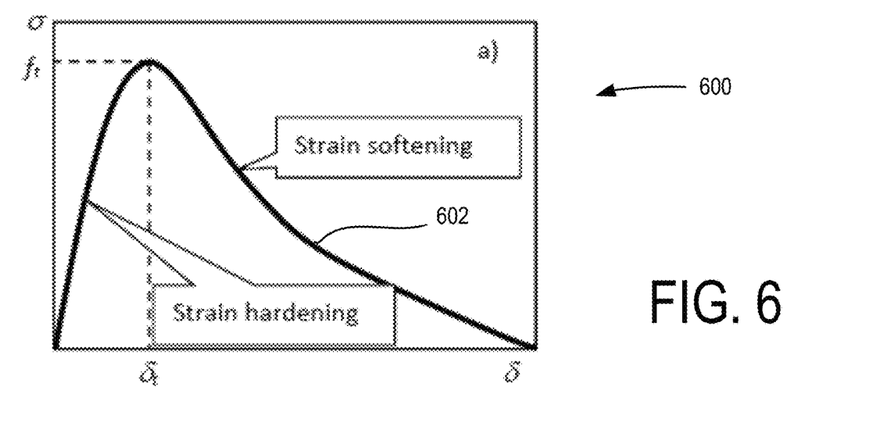
FIG. 6 is a graph of a traction-separation constitutive law curve for an intrinsic cohesive zone model.
Figure 7:
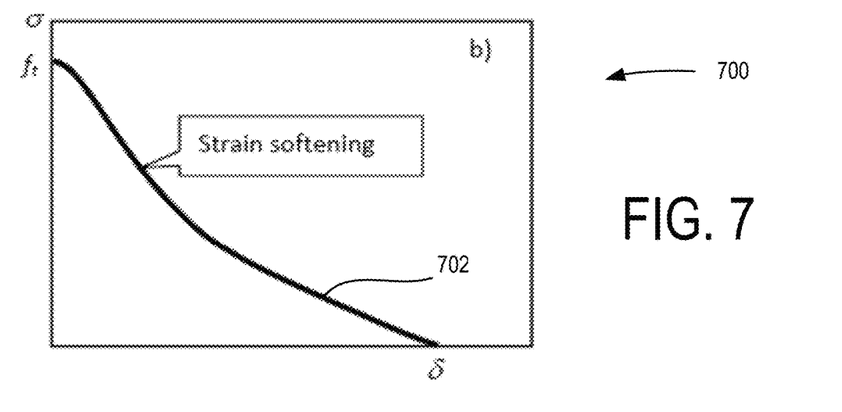
FIG. 7 is a graph of a traction-separation constitutive law curve for an extrinsic cohesive zone model.

In simulating complex solid fracture and fragmentation problems within an FDEM modelling environment, a major problem that can arise is an inability to combine many independently defined material libraries for modeling continuum solids (elastic, plastic, damage, etc.) with different fracture initiation and propagation material models. As discussed above, the cohesive zone model (CZM) is a widely used approach for modeling problems with multiple fractures. In CZM, a response of a material being modeled is decomposed into a solid matrix part (e.g., at the material nodes 106 located inside of the finite elements) and an interfacial part that represents multi-scale processes taking place behind the fracture front (e.g., breaking of bonds between grains). The solid matrix part describes a deformation of the material through various numerical methods, such as FDEM. The fracture and fragmentation are handled by an interfacial part of cohesive elements that can coincide with a boundary of the solid matrix. Such cohesive elements are typically defined by a "traction—separation" constitutive law, such as shown by the line 602 in the graph 600 in FIG. 6, that dominates the mechanical behavior of the interfaces. As shown, there is a monotonic stress and strain increase up to a fracture strength $f_t$ and fracture separation $\delta_t$ during a strain hardening period, and a stress degradation during a strain softening period until an initiated fracture is completed after which strain reaches a limit value indicating material separation. FIG. 7 shows a graph 700 of a line 702 corresponding to another traction—separation constitutive law similar to the line 602 but without a hardening period before the stress reaches a fracture strength $f_t$.

In the art, CZM are typically classified as (and limited to) an intrinsic cohesive zone model (also referred as initially elastic cohesive model) or an extrinsic cohesive zone model (also called initially rigid cohesive model). The constitutive law corresponding to line 602 in FIG. 6 illustrates an example intrinsic cohesive zone model. In intrinsic CZM models, cohesive elements are introduced at the beginning of the calculation. For example, an FDEM mesh can be created by a user, and at the beginning of an associated simulation the FDEM mesh can include cohesive elements upon which calculations are occurring, including evaluation of discrete fracture criteria. To enforce a continuity of the material being modeled in an intrinsic approach, "strain-hardening" with a sufficiently large initial slope must be introduced in the traction— separation curve. This initial slope typically represents an elastic modulus that is substantially larger than an elastic modulus of the material being modeled (e.g., by 100×, 1000×, etc.) and can be associated with atomic forces or forces acting on atomic scales. With the strain-hardening portion of the curve, an intrinsic approach reduces the stiffness of a system artificially. On the other hand, in an extrinsic cohesive zone model, cohesive elements are dynamically inserted in the model during the simulation according to a local stress state of the mesh. With a local stress state for insertion of the cohesive elements corresponding to the fracture strength $f_t$ of the material (and a zero-strain insertion-point), extrinsic cohesive zone models can avoid the artificial compliance associated with intrinsic models. However, extrinsic models also tend to be "time-discontinuous" during the transition from continua to discontinua. These issues for intrinsic and extrinsic models have been suffered for decades since the inception of CZMs.

Figure 8:
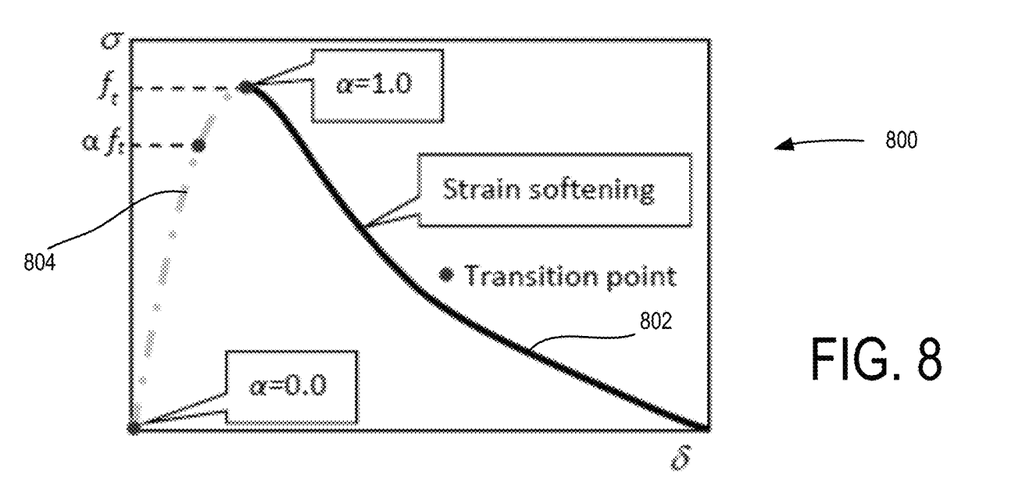
FIG. 8 is a graph of a traction-separation constitutive law curve for a unified cohesive zone model.

As discussed above, in some examples herein, evaluation of a discrete fracture criteria can include use of the parameter α to control a point of transition from continuum to discontinuum. FIG. 8 illustrates a relationship between a and intrinsic/extrinsic approaches in a graph 800 having a line 802 corresponding to a traction-separation constitutive law relation. In representative unified CZM examples, α can be a user-selectable value (e.g., between 0 and 1) that can be multiplied by $f_t$ (or a separation $δ_t$) to vary how the traction-separation constitutive law relation may be applied in the model. As the parameter a is varied, an initial part of the curve that crosses a zero-strain value slides along a dashed portion 804 of the line 802. Similar to extrinsic CZM, unified CZM examples can dynamically insert cohesive elements into the FDEM simulation using a local stress state, though with unified CZM examples additional material states can be used. Thus, the user-selectable a can be used to select the threshold at which cohesive elements become dynamically inserted into the FDEM mesh during a simulation.

In some unified CZM examples using a value of 1 for α, a load balance can be provided before and after the dynamic insertion of the cohesive elements, effectively retrieving an enhanced extrinsic CZM from the unified CZM. With the force balancing, the corresponding simulation with enhanced extrinsic CZM modeling can reduce the extent of or avoid a time-discontinuity that normally occurs at the time of dynamic cohesive element insertion in an extrinsic approach (which also corresponds to the transition from continuum to discontinuum mechanics modeling). Avoiding a time-discontinuity can avoid consequent numerical instabilities or solution convergence failures. In a unified CZM example using a value of 0 for α, an intrinsic CZM can be obtained. For various unified CZM examples with α having a value between 0.0 and 1.0, a combined intrinsic-extrinsic CZM example is obtained. The user-selectability of the parameter α as a threshold for insertion of cohesive elements can be advantageous in various modeling applications depending on the experience of the user.

Also, various unified CZM examples can use material states other than a stress state to determine a point of dynamic insertion of cohesive elements. For example, some unified CZM models can include a point of transition from continua to discontinua that is controllable through the user-selectable parameter α and the strain tensor (e.g., rather than the stress tensor, or in addition to the stress tensor) at the various nodes of the FDEM mesh being simulated. Furthermore, selected CZM examples herein that use the strain tensor as a factor in determining whether a fracture is initiated (such as according to Equation 1 above) can enable different material libraries for modeling continuum solids to be interoperable with material models for fracture initiation and propagation, allowing any (or almost any) continuum material library to be attached or associated with a FDEM material node and be used in the simulation of complex fractures using CZM. For example, even continuum damage material models can be made to work with discontinuum models, where stress-based fracture criterion would fail due to the introduction of competing damage mechanisms, which can be described as "damage-on-damage" situations. For these scenarios, the strain tensor (e.g., at the material point level 106) can be used as a threshold (at any stage of deformation) to determine when to switch from continuum damage based models to discontinuum damage based models, thereby avoiding the "damage-on-damage" issue.

Figure 9:
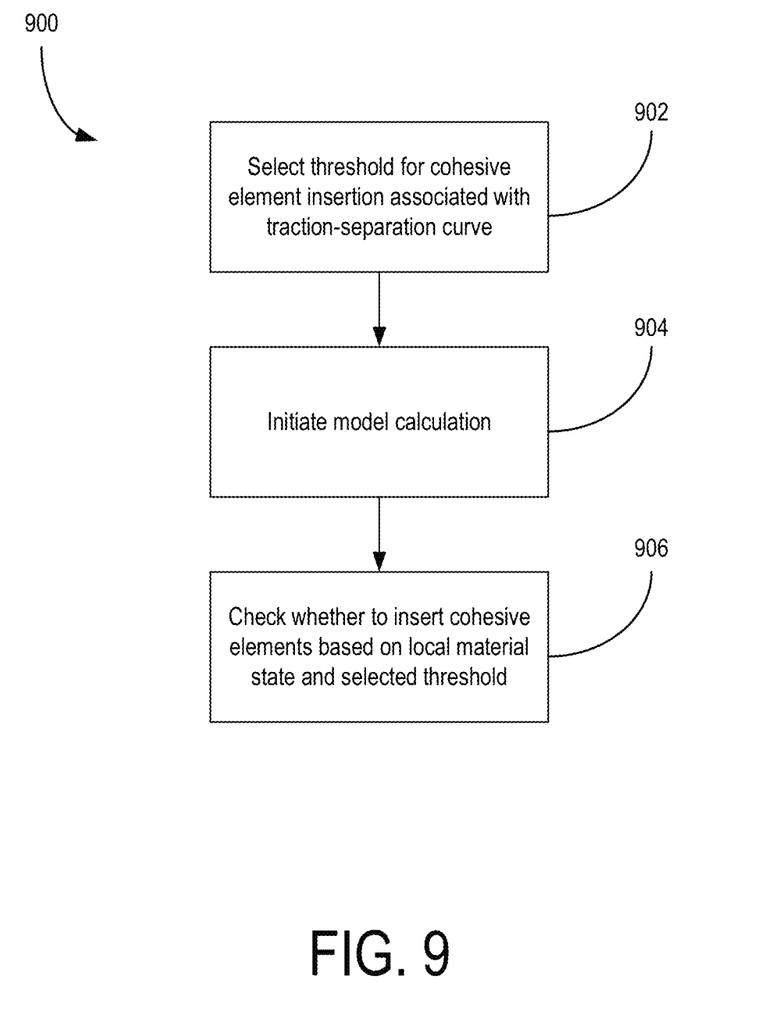
FIG. 9 is a flowchart of a method of inserting cohesive element in a mesh based on a traction-separation threshold.

FIG. 9 shows an example of a method 900 that implements a unified CZM approach. At 902, a threshold for dynamic insertion of cohesive elements in a FDEM mesh is selected by a user. In some examples, the threshold corresponds to a user-selectable value between 0.0 and 1.0 (though other ranges, discrete values, or scales may be used) that corresponds to a continuum mechanics to discontinuum mechanics transition point along a traction-separation relation, such as a traction-separation constitutive law curve. At 904, an FDEM simulation using the FDEM mesh is initiated. During the simulation, at 906, cohesive elements are dynamically inserted into the FDEM mesh based on local material states that are calculated according to the FDEM techniques applied to the mesh and the user-selected threshold. The method 900 can be used in various examples disclosed herein as well as with other numerical programs, simulations, and modeling.

Figure 10:
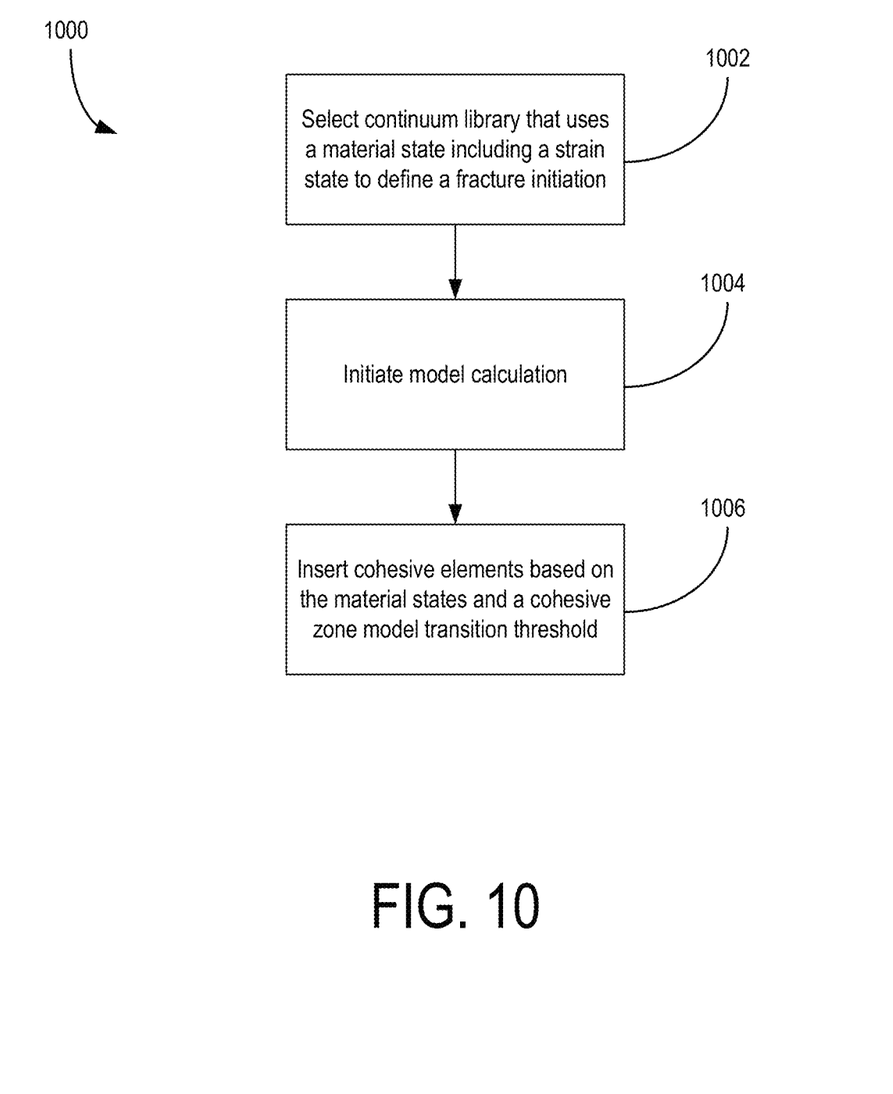
FIG. 10 is a flowchart of a method of selecting a material library associated with fracture initiation and modeling.

FIG. 10 shows an example of a method 1000 that implements a CZM approach enabling attaching of multiple continuum material libraries to nodes of an FDEM element mesh. At 1002, a user can select a continuum material library that uses a material state including a strain state to define a fracture initiation. In some examples, any continuum material library can be imported into a FDEM workbench configured to model complex fractures using CZM for discontinuum modeling, including stress-specific material libraries, strain-specific material libraries, material libraries directed to elasticity, plasticity, damage, strain rate, hardening, shock, and/or phase change, etc. An FDEM simulation is initiated at 1004 using the selected continuum material library, and at 1006, cohesive elements are inserted into a mesh of the FDEM simulation based on a calculated material state in the FDEM mesh, and a CZM transition threshold. The method 1000 can be used in various examples disclosed herein as well as with other numerical modeling techniques and simulations.

Figure 11:
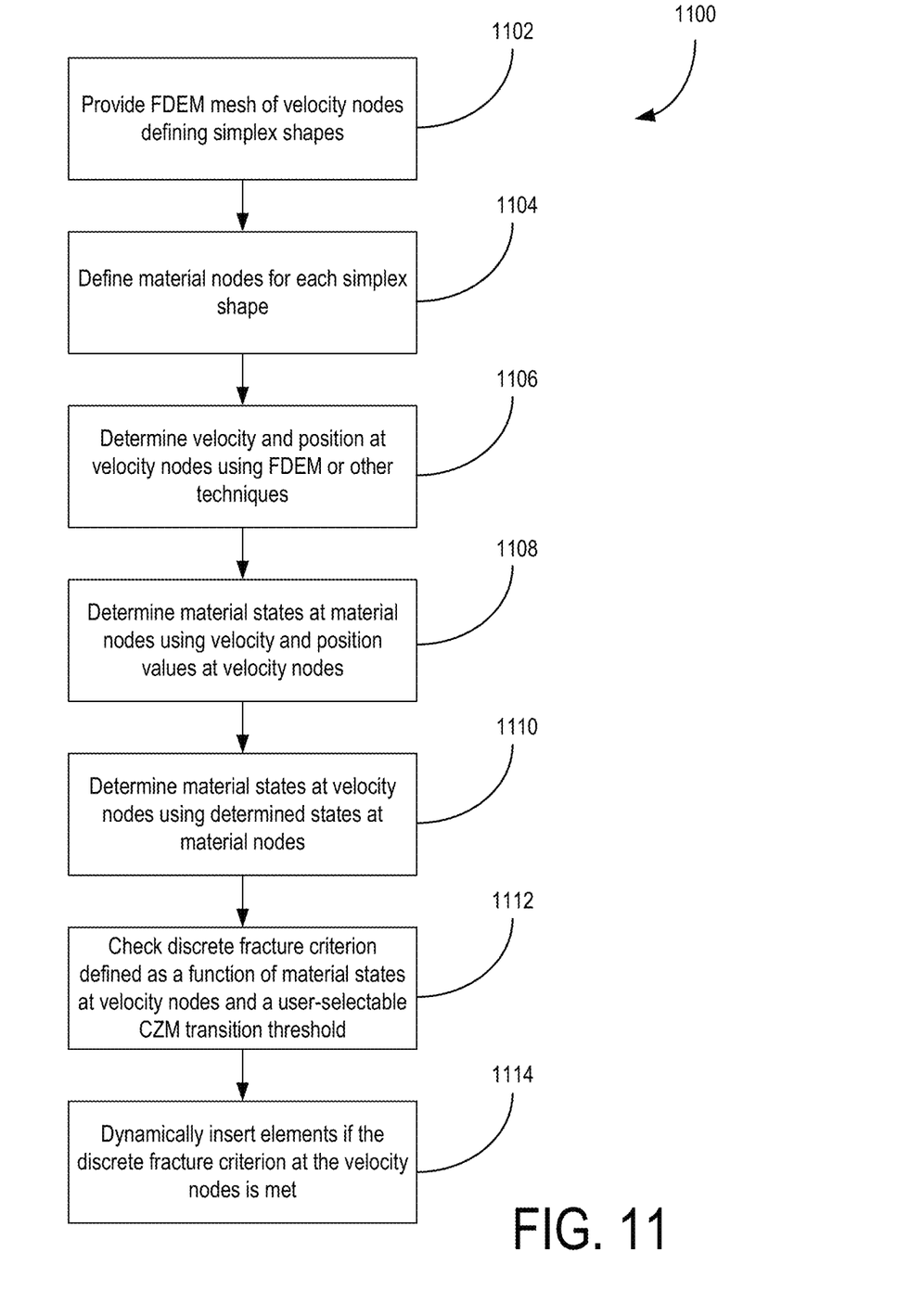
FIG. 11 is a flowchart of a method of dynamically inserting cohesive elements into a FDEM mesh during a simulation.

FIG. 11 is an example method 1100 using FEM or FDEM techniques and inserting cohesive elements based on a discrete fracture criterion. At 1102, an FDEM mesh having a plurality of velocity nodes is provided. For example, FDEM meshes can be constructed using various FDEM tools and workbenches, including commercially available tools and workbenches such as Hybrid Optimization Software Suite (HOSS) (developed by Los Alamos National Laboratory), Abaqus, LS-Dyna, Ansys, etc. The velocity nodes can define various shapes and for which material nodes can be defined at 1104. During a simulation, velocity and position of the velocity nodes can change as forces and/or other boundary conditions act on the FDEM mesh, and various FDEM techniques can be used to determine and update the velocities and positions for the velocity nodes at 1106, as the simulation proceeds from one time increment to the next. At each time increment, material states can be determined at the material nodes, such as one or more of stress, strain, temperature, etc., using the velocity and position values at the velocity nodes, at 1108. At 1110, the material states determined for the material nodes are used to determine material states at the velocity nodes. At 1112, the material states at the velocity nodes together with a user-selectable cohesive zone model threshold are used to define a fracture criterion determining when the cohesive elements are dynamically inserted, and at 1114, cohesive elements are inserted into the FDEM mesh. In some examples, the fracture criterion can be met at a simulation's initiation and with a threshold set at a zero value, cohesive elements can be inserted at the beginning of the simulation. In further examples, the cohesive elements can be inserted dynamically during the simulation as material states meet the fracture criterion. In selected examples, material states that are used in the criterion include a strain so that a number of continuum material libraries can be associated with material nodes of the FDEM mesh. The method 1100 can be used in various examples disclosed herein as well as with other numerical analysis programs, simulations, and modeling.

Figure 12:
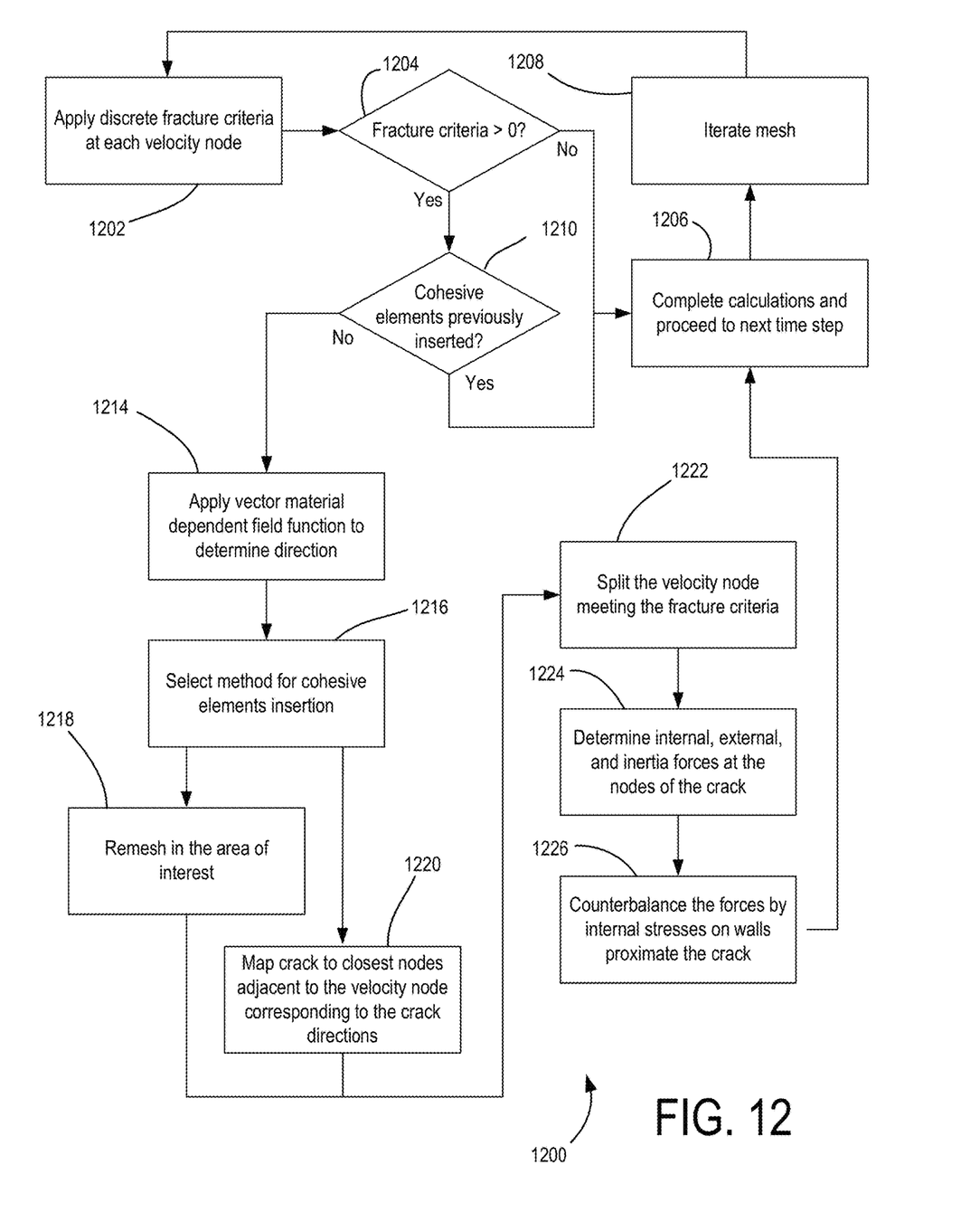
FIG. 12 is a flowchart of a method of modeling complex solid fractures and fragmentations.

FIG. 12 shows an example method 1200 of applying discrete fracture criteria and modeling fractures. In representative examples, the method 1200 can be used with the method 1100, but such examples can also be performed alone, separately, or with other method steps, etc. During an FDEM simulation that can model fracture of materials through a combination of continuum and discontinuum material modeling, at 1202, one or more discrete fracture criteria are applied at (typically all) velocity nodes of an FDEM mesh of the simulation. Fracture criteria can have various forms and are generally a function of material states of nodes of the mesh. Fracture criteria can further be a function of a traction-separation curve threshold. Some examples apply the criteria by computing a value based on various inputs and determining from the computed value whether to insert cohesive elements to model crack initiation and crack formation. For example, at 1204 the computed value can be compared in an inequality. As shown, a scalar output greater than zero can correspond to a fracture initiation, while for values that are zero or less no fracture is initiated and no cohesive elements are inserted (though cohesive elements may already ab initio or inserted previously). If it is determined at 1204 that a fracture criterion is not met or exceeded, at 1206, various other computations can be completed for a selected time step of the simulation, and the mesh can be recalculated at 1208 at the next time step to resolve and update various nodal forces and material states. Reapplication of the discrete fracture criteria can occur at 1202 at the next time step so that the simulation can continue to model the evolution of fracture initiation and fracture propagation for a solid material.

After application of fracture criteria indicates the initiation of a crack, the program can check, at 1210, whether cohesive elements have been previously inserted into the FDEM mesh under simulation. For example, where an intrinsic traction-separation curve setting is applied to the FDEM mesh at the beginning of the simulation, cohesive elements will already be present in the FDEM mesh. Similarly, if a check of the discrete fracture criteria at an earlier time step included values of computed material states that were large but not sufficient to correspond to fracture initiation, or if a comparison of material states exceeded a traction-separation relation threshold, cohesive elements may be in place in the FDEM mesh due to insertion at a previous time step.

With cohesive elements in the FDEM mesh and fracture criteria indicating a fracture initiation, at 1214, a crack direction can be determined by applying a vector material dependent field function. Various methods of crack creation can be used and one or more can be selected at 1216 based on material parameters (though such approaches can also be selected before simulation begins or different for different material libraries). For example, at 1218, one crack creation approach can include remeshing the FDEM mesh in the area of interest such that additional elements (or new elements with redefined nodal positions) can be created such that edges of element shapes align with the crack direction determined at 1214. In another crack creation approach, at 1220, the determined crack direction can be mapped to the closest existing FDEM nodes so that a crack can be modeled to propagate along existing shape interfaces.

After the local crack direction and path in the FDEM mesh are determined, the velocity nodes indicating the initiation of a discrete fracture are split at 1222 into a plurality of velocity nodes. At 1224, various internal, external, and inertia forces are determined at the split velocity nodes and at 1226, the forces from 1224 are counterbalanced by internal stress on walls proximate the propagating crack. After the force balance, various other calculations for the current time step of the FDEM mesh simulation can be completed, at 1206, and time step of the simulation can be incremented so that additional mesh iterations can be performed at 1208. The method 1200 can be used in various examples disclosed herein as well as with other numerical analysis programs, simulations, and modeling. In some examples, cohesive elements can be removed from the mesh during the performing the numerical simulation based on a comparison of local material states of the mesh to a selected cohesive element removal threshold, so as to reduce computational cost.

Figure 13:
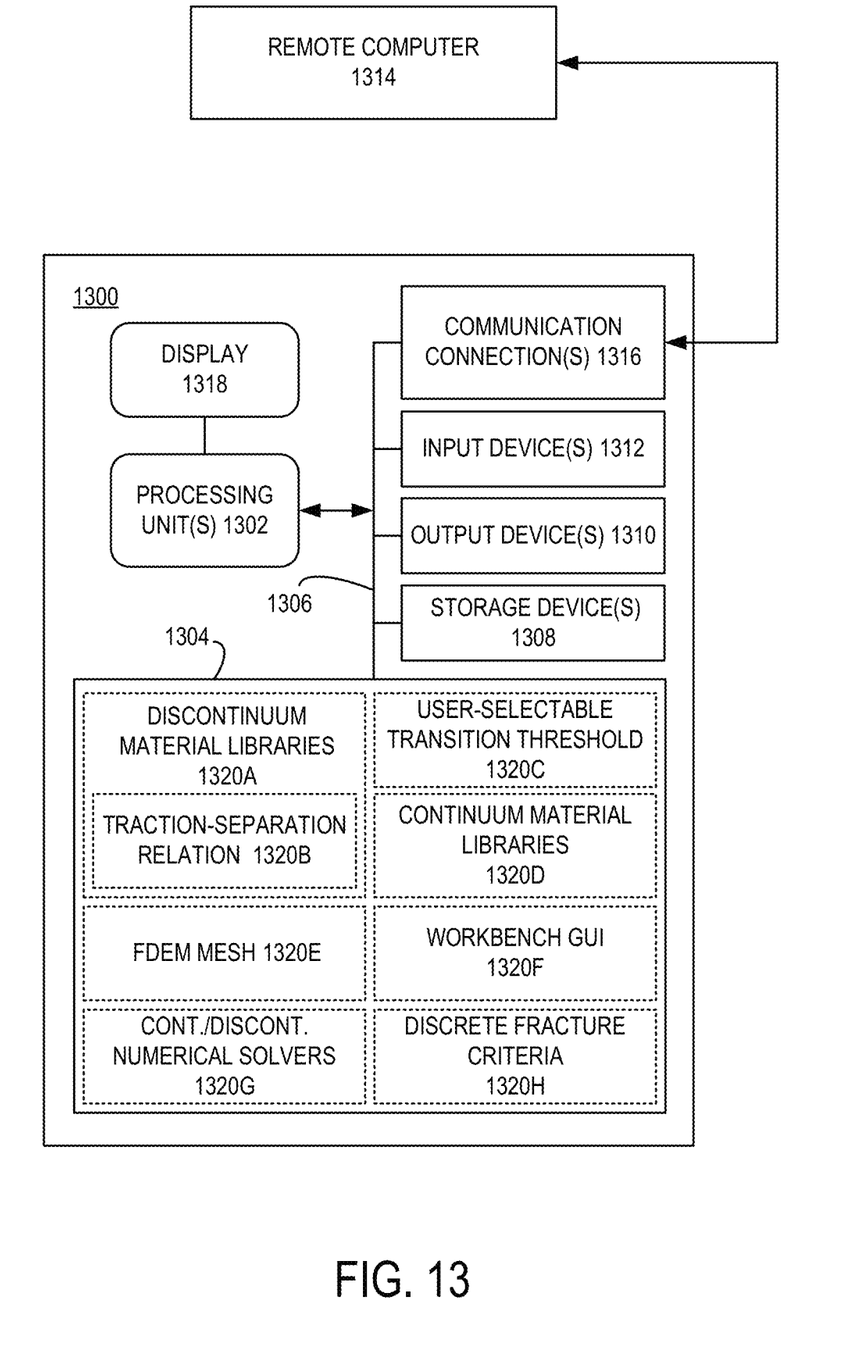
FIG. 13 is schematic of a computing system configured to model complex fractures using FDEM or other techniques.

FIG. 13 is an example of a computing system 1300 configured to perform one or more FDEM simulations of solid material fractures. In general, the disclosed technology is described in the general context of computer-executable instructions, such as program modules, being executed by a dedicated processor, or other digital processing system or programmable logic device. Generally, program modules include routines, programs, objects, components, data structures, libraries, etc., that perform particular tasks or implement particular data types. Moreover, examples of the disclosed technology herein may be implemented with other computer system configurations, including hand-held devices, multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices. Distributed processing can be particularly applicable in FDEM as computational resources for performing simulation can be demanding.

The computing system 1300 can include multiple components in a computing environment, including a processor 1302 (including multiple processors, distributed processors, etc.) and a memory 1304. The memory 1304 can have stored instructions executable by the processor 1302 for constructing FDEM meshes and/or executing one or more FDEM simulations. Different components of the computing environment, including the processor 1302 and memory 1304, can be coupled together with a system bus 1306. The system bus 1306 can include one or more of several types of bus structures including a memory bus or memory controller, a peripheral bus, and a local bus using any of a variety of bus architectures. The memory 1304 can include various types, including volatile memory (e.g., registers, cache, RAM), non-volatile memory (e.g., ROM, EEPROM, flash memory, etc.), or a combination of volatile and non-volatile memory. The memory 1304 is generally accessible by the processor 1302 and can store software in the form computer-executable instructions that can be executed by the processor 1302. In some examples, processors can be configured based on RISC or CISC architectures, and can include one or more general purpose central processing units, application specific integrated circuits, graphics or co-processing units or other processors. In some examples, multiple core groupings of computing components can be distributed among system modules, and various modules of software can be implemented separately.

The computing system 1300 also typically includes or is coupled to one or more storage devices 1308 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1306 by a hard disk drive interface, a magnetic disk drive interface, and an optical drive interface, respectively. The drive or drives and associated computer-readable media can provide nonvolatile storage of computer-readable instructions, data structures, program modules, and other data for the computing system 1300. Other types of non-transitory computer-readable media which can store data that is accessible by a PC, such as magnetic cassettes, flash memory cards, digital video disks, CDs, DVDs, RAMs, ROMs, and the like, may also be used in the computing environment. The storage 1308 can be removable or non-removable and can be used to store information in a non-transitory way which can be accessed by the processor 1302 or other components within the computing environment.

A number of program modules (or data) may be stored in the memory 1304 and/or storage devices 1308, including an operating system, one or more application programs, other program modules, and program data. A user may enter commands and information into the computing system 1300 through one or more input devices 1312 such as a keyboard and a pointing device such as a mouse. Other input devices may include a digital camera, microphone, satellite dish, scanner, display, or the like. These and other input devices are often connected to the one or more processors 1302 through a serial port interface that is coupled to the system bus 1306 but may be connected by other interfaces such as a parallel port, game port, or universal serial bus (USB). A display 1318 such as a monitor or other type of display device also can be connected to the system bus 1306 via an interface, such as a video adapter. Some or all data and instructions can be communicated with a remote computer 1314 through communication connections 1316 (e.g., wired, wireless, etc.) if desired.

As shown in FIG. 13, some examples can include one or more discontinuum material libraries associated with different materials or different discontinuum modeling approaches, in a memory 1320A. One or more of the discontinuum material libraries can include a traction-separation relation, in a memory 1320B, that can describe an artificial elasticity of an intrinsic cohesive zone model, one or more fracture strengths (such as a shear strength and/or tensile strength), and a fracture strain evolution. Additional discontinuum material libraries can be extrinsic CZM libraries or a combination of intrinsic and extrinsic. Representative examples can include a user-selectable continuum-discontinuum transition threshold in a memory 1320C. Such thresholds can correspond to a position in a range of a strain hardening region of the traction-separation relation where continuum modeling is changed to discontinuum fracture modeling and where cohesive elements associated with discontinua models are inserted into a FDEM mesh being simulated. Different thresholds can be fixed or variable for different discontinuum material libraries. Some examples can include multiple continuum material libraries in a memory 1320D, including libraries based on various material states, including stress, plasticity, strain rate, hardening, shock, phase change, etc. The computing system 1300 typically includes an FDEM mesh that is being simulated in a memory 1320E, including data associated with nodal position, displacement, geometry, material state, time step, etc. In some examples, the computing system 1300 can include a graphical user interface (GUI) and workbench in a memory 1320F that can be used to provide configurability and visualization of the FDEM mesh 1320E or other modeling functions, and an environment in which a user can construct the FDEM mesh, including attaching various material libraries in the memories 1320A, 1320D to different velocity and/or material nodes of the FDEM mesh being created and stored in the memory 1320E and selecting user-selectable thresholds stored in the memory 1320C. In some examples, the computing system 1300 can include one or more FDEM solvers in a memory 1320G that governing equations for the interactions between elements of the FDEM mesh in 1320E, and other model processes and equations. Additional numerical solvers can be used including FEM, DEM, XDEM, AEM, MFEM, FDM, etc. Discrete fracture criteria can be stored in a memory 1320H and can be used to determine discrete fractures in the FDEM mesh in 1320E, based on various material states at different time-steps of a simulation, and in some cases the user-selectable threshold(s) in 1320C. In particular examples, a number of available continuum material libraries in 1320D is greatly expanded by using a strain state as a material state in the discrete fracture criteria in 1320H.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high level abstractions of the actual operations that are performed. The actual operations that correspond to these terms will vary depending on the particular implementation and are readily discernible by one of ordinary skill in the art.

In some examples, values, procedures, or apparatuses are referred to as "lowest," "best," "minimum," or the like. It will be appreciated that such descriptions are intended to indicate that a selection among many used functional alternatives can be made, and such selections need not be better, smaller, or otherwise preferable to other selections.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A computer-implemented method, comprising:
   providing a numerical simulation mesh comprising a plurality of nodes; and
   performing a numerical simulation of a solid material using the mesh and a user-selectable transition threshold associated with a cohesive zone model traction-separation relation; and
   comparing local material states of the mesh to the user-selectable transition threshold during the performing the numerical simulation to determine whether to insert cohesive elements in the mesh;
   wherein the cohesive elements are not included at an initiation of the numerical simulation.

2. The computer-implemented method of claim 1, further comprising dynamically inserting cohesive elements in the mesh based on the comparison; and
   balancing loads at the inserted cohesive elements.

3. The computer-implemented method of claim 1, wherein the comparing comprises applying a discrete fracture criterion at a node of the plurality of nodes of the mesh based on the local material states of the mesh and the transition threshold.

4. The computer-implemented method of claim 3, wherein the discrete fracture criterion defines when the cohesive elements are to be dynamically inserted and is a generalized criterion that can vary for different materials and that is a function of the Cauchy stress tensor and/or the strain tensor and the transition threshold.

5. The computer-implemented method of claim 3, further comprising, for a met discrete fracture criterion, dynamically inserting cohesive elements in the mesh; and
   applying a vector material dependent field function to determine a direction of a fracture from a fracture initiating node.

6. The computer-implemented method of claim 5, further comprising splitting the fracture initiating node into at least two nodes and mapping the material states to an adjacent velocity node closest to the direction of the fracture.

7. The computer-implemented method of claim 5, further comprising remeshing at least a portion of the mesh proximate the fracture initiating node to define a mesh shape oriented along the direction of the fracture; and
   splitting the fracture initiating node into at least two nodes and mapping the material states to adjacent velocity nodes.

8. The computer-implemented method of claim 1, wherein the user-selectable transition threshold is defined in a range between 0 and 1 and corresponds to a ratio of a stress and a fracture strength of the solid material.

9. The computer-implemented method of claim 1, wherein the plurality of nodes comprises velocity nodes associated with material-specific fracture libraries and defining simplex shapes, and material nodes associated with the simplex shapes and associated with material libraries.

10. The computer-implemented method of claim 9, wherein the performing the numerical simulation includes:
    determining velocities and positions for the velocity nodes using one or more numerical analysis techniques;
    determining material states for the material nodes based on the material libraries and the determined velocities and positions; and
    determining material states for the velocity nodes based on the determined material states for the material nodes.

11. The computer-implemented method of claim 9, wherein the material-specific fracture libraries and material libraries are user-selectable libraries.

12. The computer-implemented method of claim 11, wherein the material-specific fracture libraries include fracture material libraries associated with discrete fracture propagation, and wherein the material libraries include continuum material libraries.

13. The computer-implemented method of claim 12, wherein the continuum material libraries include libraries describing elasticity, plasticity, damage, strain rate, hardening, shock, or phase change.

14. The computer-implemented method of claim 1, further comprising processing a solid material based on the performed numerical simulation, including one or more of surface material processing, subsurface material processing, oil drilling, fracking, well drilling, subsurface explosions, or mining operations, earthquake rupture simulations, or structural collapse.

15. The computer-implemented method of claim 1, wherein the insertion of cohesive elements corresponds to a time-continuous transition between continua mechanics modeling and discontinua mechanics modeling;
wherein the local material states include a stress, a strain, a stress and strain, a stress and an additional other material state, a strain and an additional other material state, or a stress, strain and an additional other material state.

16. The computer-implemented method of claim 1, further comprising removing cohesive elements from the mesh during the performing the numerical simulation based on a comparison of local material states of the mesh to a selected cohesive element removal threshold.

17. An apparatus, comprising:
at least one processor; and
memory coupled to the at least one processor and configured with instructions that, when executed by the at least one processor, cause the apparatus to:
perform a numerical simulation of a solid material using a numerical simulation mesh comprising a plurality of nodes, wherein the numerical simulation includes a user-selectable transition threshold associated with a cohesive zone model traction-separation relation that determines whether to insert cohesive elements in the mesh; wherein the numerical simulation includes: (1) comparing local material states of the mesh to the user-selectable transition threshold during the performing the numerical simulation to determine whether to insert the cohesive elements in the mesh; (2) providing smooth transition of the material states from continuum to discontinuum to ensure the dynamic equilibrium of the system, wherein the cohesive elements are not included at an initiation of the numerical simulation.

18. A computer-implemented method, comprising:
performing a numerical simulation of a solid material using a numerical simulation mesh comprising a plurality of nodes, wherein the numerical simulation includes a user-selectable transition threshold associated with a cohesive zone model traction-separation relation; and
comparing local material states including a strain state of the mesh to the transition threshold during the performing the numerical simulation to determine whether to dynamically insert cohesive elements in the finite element mesh; and
providing smooth transition of the material states from continuum to discontinuum to ensure the dynamic equilibrium of the system;
wherein the cohesive elements are not included at an initiation of the numerical simulation.

19. The computer-implemented method of claim 18, further comprising associating a continuum material library with a node of the mesh, wherein the associated continuum material library uses a strain state to define a fracture initiation.

* * * * *